US009016955B2

(12) United States Patent
Grinderslev et al.

(10) Patent No.: US 9,016,955 B2
(45) Date of Patent: *Apr. 28, 2015

(54) OPTICAL CONNECTOR WITH FERRULE INTERFERENCE FIT

(71) Applicant: Tyco Electronics Corporation, Berwyn, PA (US)

(72) Inventors: Soren Grinderslev, Hummelstown, PA (US); Michael Aaron Kadar-Kallen, Harrisburg, PA (US); Daniel E. Wertman, Mechanicsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/840,982

(22) Filed: Mar. 15, 2013

(65) Prior Publication Data
US 2013/0272660 A1    Oct. 17, 2013

Related U.S. Application Data

(60) Continuation of application No. 13/357,077, filed on Jan. 24, 2012, now Pat. No. 8,469,605, which is a division of application No. 12/475,887, filed on Jun. 1, 2009, now Pat. No. 8,123,417.

(51) Int. Cl.
*G02B 6/36* (2006.01)
*G02B 6/38* (2006.01)
(Continued)

(52) U.S. Cl.
CPC ............ *G02B 6/3869* (2013.01); *G02B 6/3853* (2013.01); *G02B 6/0218* (2013.01);
(Continued)

(58) Field of Classification Search
CPC .. G02B 6/3853; G02B 6/3855; G02B 6/4266; G02B 6/4267; G02B 6/0218; G02B 6/1203
USPC ............................................................ 385/78
See application file for complete search history.

(56) References Cited

U.S. PATENT DOCUMENTS

| 4,907,853 A | 3/1990 | Hiratsuka |
| 5,216,734 A | 6/1993 | Grinderslev |

(Continued)

FOREIGN PATENT DOCUMENTS

| EP | 1884809 A1 | 2/2008 |
| JP | 64-74510 A | 3/1989 |

(Continued)

OTHER PUBLICATIONS

Naganuma, Norihisa, English Translation of JP64-74510, Mar. 1989.

*Primary Examiner* — Charlie Y Peng

(57) ABSTRACT

An optical connector for operation within a temperature range, comprising: (a) a ferrule comprising a first material having a coefficient of thermal expansion COE-1, and a diameter no greater than a diameter d1 below a transition temperature Ts within the temperature range and no less than a diameter d2 above Ts; (b) a spring disposed behind and in contact with the ferrule to apply a forward force to the ferrule; and (c) a housing comprising a second material having a coefficient of thermal expansion COE-2 and defining a bore hole having a diameter greater than d2, and an interface having a restricted bore hole having a diameter no greater than a diameter d3 below Ts, and no less than a diameter d4 above Ts, wherein connector configuration is COE-2>COE-1 with d>d3 and d2<d4 or COE-2<COE-1 with d1<d3 and d2>d4.

21 Claims, 5 Drawing Sheets

(51) Int. Cl.
    *G02B 6/02*    (2006.01)
    *G02B 6/42*    (2006.01)
    *G02B 6/12*    (2006.01)
    *G02B 6/32*    (2006.01)

(52) U.S. Cl.
    CPC ............ *G02B6/3855* (2013.01); *G02B 6/4267* (2013.01); *G02B 6/4266* (2013.01); *G02B 6/1203* (2013.01); *G02B 6/32* (2013.01)

(56) References Cited

U.S. PATENT DOCUMENTS

| | | |
|---|---|---|
| 5,396,572 A | 3/1995 | Bradley et al. |
| 5,422,970 A | 6/1995 | Miller et al. |
| 5,425,039 A | 6/1995 | Hsu et al. |
| 5,917,975 A | 6/1999 | Bloom |
| 6,000,858 A * | 12/1999 | Bloom ............................. 385/94 |
| 6,141,098 A | 10/2000 | Sawatari et al. |
| 6,155,146 A | 12/2000 | Andrews et al. |
| 6,238,103 B1 * | 5/2001 | Ezawa ............................. 385/81 |
| 6,621,957 B1 | 9/2003 | Sullivan et al. |
| 6,885,797 B2 | 4/2005 | Lee et al. |
| 7,063,466 B2 | 6/2006 | Ferguson |
| 7,559,701 B2 | 7/2009 | Knobloch et al. |
| 8,123,417 B2 * | 2/2012 | Wertman et al. ................. 385/78 |
| 2006/0104575 A1 * | 5/2006 | Ikeda et al. ..................... 385/88 |
| 2007/0183723 A1 | 8/2007 | Matsumoto et al. |
| 2008/0050073 A1 | 2/2008 | Kadar-Kallen et al. |
| 2008/0226236 A1 | 9/2008 | Pepin et al. |

FOREIGN PATENT DOCUMENTS

| | | |
|---|---|---|
| WO | 87/01464 | 3/1987 |
| WO | 02/079840 A1 | 10/2002 |

* cited by examiner

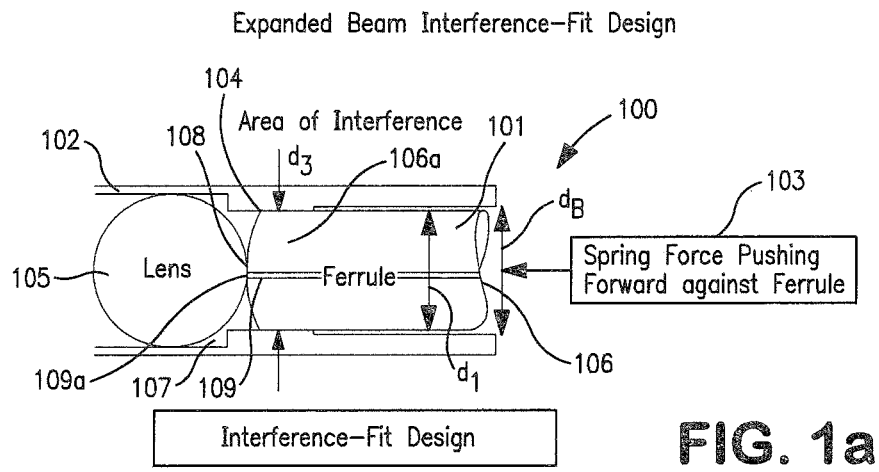
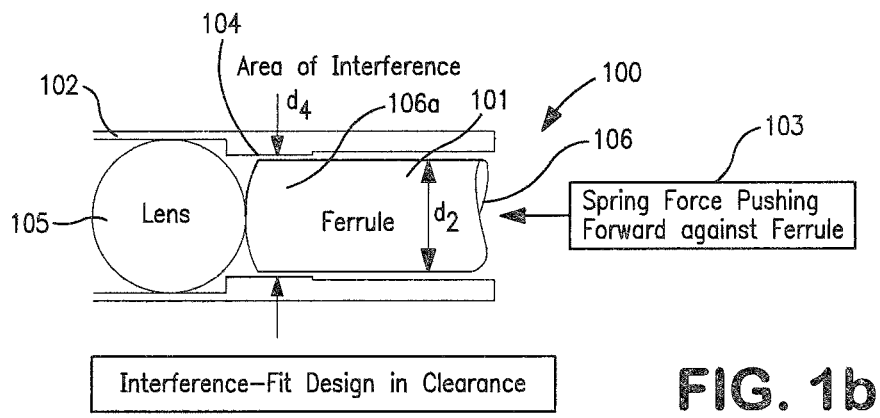
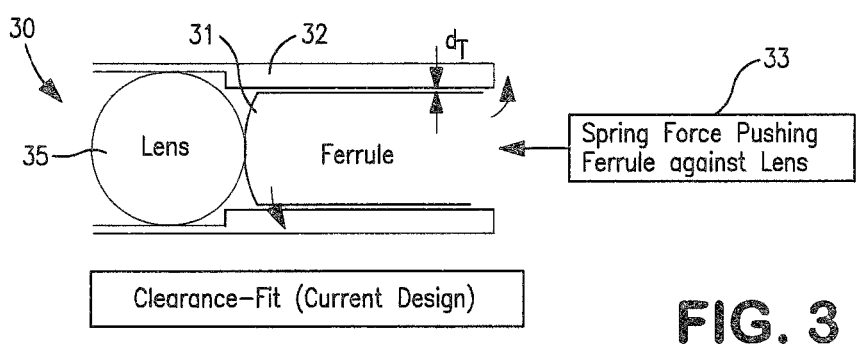

OPTICAL CONNECTOR WITH FERRULE INTERFERENCE FIT

CROSS-REFERENCE TO RELATED APPLICATIONS

The present application is a continuation of U.S. patent application Ser. No. 13/357,077, filed Jan. 24, 2012, which is a divisional application of U.S. patent application Ser. No. 12/475,887, filed Jun. 1, 2009, which are all incorporated by reference in the entirety. The present application claims priority to the aforementioned applications.

FIELD OF INVENTION

The present invention relates generally to an optical connector, and, more specifically, to an optical connector suitable for a broad range of operating temperatures.

BACKGROUND OF INVENTION

Optical fiber connectors are a critical part of essentially all optical fiber communication systems. For instance, such connectors are used to join segments of fiber into longer lengths, to connect fiber to active devices (e.g., radiation sources, detectors and repeaters), and to connect fiber to passive devices (e.g., switches, multiplexers, and attenuators). A typical optical fiber connector comprises a housing and a ferrule within the housing. The ferrule has one or more bore holes, and a fiber secured in each bore hole such that the end of the fiber is presented for optical coupling by the ferrule. The housing is designed to engage a "mating structure" having an optical path to which the fiber optically couples during mating. The mating structure may be another connector or an active or passive device as mentioned above. The optical path may be, for example, a fiber in a ferrule, a waveguide in a substrate, a lens, or an optically-transparent mass. The principal function of an optical fiber connector is to hold the fiber end such that the fiber's core is axially aligned with the optical pathway of the mating structure. This way, light from the fiber is optically coupled to the optical pathway.

Of particular interest herein are "expanded beam" optical connectors. Such connectors are used traditionally in high vibration and/or dirty environments, where "physical contact" between the fiber and the light path of mating connector is problematic. Specifically, in dirty environments, particulates may become trapped between connectors during mating. Such debris has a profoundly detrimental effect on the optical transmission since the particles are relatively large compared to the optical path (e.g., 10 microns diameter in single mode) and are therefore likely to block at least a portion of the optical transmission. Furthermore, in high-vibration environments, optical connectors having ferrules in physical contact tend to experience scratching at their interface. This scratching diminishes the finish of the fiber endface, thereby increasing reflective loss and scattering.

To avoid problems of debris and vibration, a connector has been developed which expands the optical beam and transmits it over an air gap between the connectors. By expanding the beam, its relative size increases with respect to the debris, making it less susceptible to interference. Further, transmitting the beam over an air gap eliminates component-to-component wear, thereby increasing the connector's endurance to vibration. Over the years, the expanded beam connector has evolved into a ruggedized multi-fiber connector comprising an outer housing, which is configured to mate with the outer housing of a mating connector, typically through a screw connection. Contained within the outer housing are a number of inner assemblies or "inserts." Each insert comprises an insert housing, a ferrule assembly contained within the insert housing and adapted to receive a fiber, and a ball lens at a mating end of the insert housing optically connected to the fiber. The ball lens serves to expand and collimate light at the connector interface. When two expanded beam connectors are mated, there is an air gap between the ball lenses of each pair of optically coupled inserts.

Tyco Electronics Corporation (Harrisburg, Pa.) currently offers a line of expanded beam connectors under the brand name PRO BEAM®. Referring to FIGS. 4(a) and (b), the single mode and multimode PRO BEAM connector inserts 41, 42 are shown schematically. The single mode (SM) expanded beam connector 41 uses a PC-polished ferrule 43 that is in contact with a glass ball lens 44. (Note: a Physical Contact (PC) polish is slightly rounded, and the surface of the fiber is nominally perpendicular to the fiber axis. A flat-polished ferrule can also be used for single mode with good results because the relatively small radius of the lens will still achieve PC-contact with the fiber endface. See, for example, Telcordia GR-326.) The lens 44 is AR coated on one side for a glass/glass interface, and, on the other side, for an air/glass interface. The multimode (MM) connector 42 of FIG. 4(b) uses a flat-polished ferrule 45, which is held, at a fixed distance from the ball lens 46 by means of a stop or a spacer 47 that is located near the ball lens. The ball lens has an antireflective (AR) coating 48 for an air/glass interface to reduce Fresnel losses. Although the multimode and single mode expanded beam connectors offered by Tyco Electronics have consistently met industry requirements, Applicants have identified a need for improved performance, particularly over a broad temperature range. The "single mode" fiber-touching-the-lens design can also be used with multimode fiber, producing a lower-loss connector because of the elimination of the fiber-to-air Fresnel-loss interfaces.

The prior art expanded beam connectors shown in FIGS. 4(a) and 4(b) involve a clearance fit between the housing 49, 50 and the ferrule 43, 45, respectively. Applicants have determined that this clearance fit is one of the underlying causes of the diminished optical performance of the connectors over a wide temperature range. Specifically, the clearance fit requires tolerance between the housing and the ferrule, which leads to tolerance buildup (e.g., in the range of 0.5 to 2.5 microns.) Even at low temperatures, excess clearance within design limits has been found to be detrimental to performance. As temperatures increase, the housing tends to expand to a greater extent than the ferrule, therefore amplifying the tolerance buildup between the ferrule and the housing. This tolerance buildup coupled with disparate thermal expansion of the housing and ferrule causes an offset and skewing effect of the ferrule within the housing. For example, referring to the connector 30 in FIG. 3, as spring 33 pushes the rear of the ferrule 31 forward, the rear can be pushed to one side of the housing 32 due to the tolerance $d_t$ between the ferrule 31 and the housing 32, causing the ferrule to skew (as indicated by the arrows), and either an offset occurs at its endface or a tilt of the ferrule can create an angle between the fiber axis and the lens axis which will result in large insertion loss variations. Thus, at higher temperatures, the skew and offset of the ferrule caused by tolerance buildup and thermal expansion becomes more severe, often to the point of diminishing optical performance below accepted standards.

Although an interference fit between the ferrule and housing would eliminate this tolerance buildup and its negative effects, Applicants recognize that, at some high temperature, the expansion of the housing becomes so great that it pulls the endface of the ferrule 31 away from the lens 35 to the point of compromising the physical contact between the two. Applicants also recognize that this temperature may be within the expected operating conditions of the connector, especially for a fiber/lens contact design as disclosed in FIG. 3.

Therefore, a need exists for a connector design that delivers desired performance over a wide range of operating temperatures. The present invention fulfills this need among others.

SUMMARY OF INVENTION

The present invention provides a connector configuration that compensates for the disparate thermal expansion/compression between the housing and the ferrule by having the interface between the ferrule and the housing transition between an interference fit and a clearance fit. More specially, when operating within normal temperatures, an interference fit between the ferrule and the housing controls, holding the ferrule in its correct axial position within the housing. However, if the temperature becomes high enough or low enough, the ferrule and housing thermally expand or shrink, respectively, at different rates such that the fit between the ferrule and the housing transforms from an interference fit to a clearance fit, thereby allowing the ferrule to move within the housing. At this point, a biasing force against the ferrule— i.e., a spring controls the axial position of the ferrule. The spring biases the ferrule forward so that it maintains physical contact with a lens, or otherwise maintains contact with a stop or other structure. Therefore, by using two ways of holding the ferrule in the housing depending on temperature—an interference fit within a normal temperature range and a clearance fit with a forward bias at relatively high/low or extreme temperatures—the connector of the present invention is optimized for performance across a broad temperature range.

Accordingly, one aspect of the present invention is an optical connector comprising a ferrule held in a housing at normal temperatures by an interference fit, and held at relatively high/low or extreme temperatures with a clearance fit and a forward bias. In one embodiment, the optical connector comprises: (a) a ferrule comprising a first material having a first coefficient of thermal expansion (COE), and having no greater than a first diameter below a transition temperature with the temperature range, and no less than a second diameter above the transition temperature, the ferrule also comprising an endface, and containing at least one fiber having a fiber end presented at the endface; (b) a spring disposed behind the ferrule and in contact with the ferrule to apply a forward urging force to the ferrule; and (c) a housing comprising a second material having a second COE, the housing defining a bore hole having a diameter greater than the second diameter, and an interface portion having a restricted bore hole having no greater than a third diameter below the transition temperature, and no less than a fourth diameter above the transition temperature; wherein the connector is configured in one of two ways, in a first configuration, the second COE is greater than the first COE, and in the second configuration, the second COE is less than the first COE; wherein, in the first configuration, the first diameter is greater than the third diameter and the second diameter is less than the fourth diameter; and wherein, in the second configuration, the first diameter is less than the third diameter, and the second diameter is greater than the fourth diameter.

Another aspect of the present invention is a method of manufacturing the connector by heating/cooling the housing or the ferrule above or below the transition temperature at which the ferrule/housing interface becomes a clearance fit, and then inserting the ferrule in the housing and letting the components cool/rise in temperature until the fit transforms to an interference fit. In one embodiment, the method comprises: (a) heating a housing above the transition temperature, while maintaining a ferrule below the transition temperature, the ferrule comprising a first material having no greater than a first diameter below a transition temperature and no less than a second diameter above the transition temperature, and having an endface, and holding at least one fiber having a fiber end presented at the endface, the housing comprising a bore hole, and an interface portion having a restricted bore hole having no greater than a third diameter below the transition temperature, and no less than a fourth diameter above the transition temperature, the third diameter being less than the first diameter and the fourth diameter being larger than the second diameter; (b) inserting the ferrule into the restricted bore hole when the housing is heated above the transition temperature; (c) allowing the housing to cool below the transition temperature such that the interface portion contracts around the ferrule to form an interference fit; and (d) disposing a resilient member in the housing such that the resilient member applies a forward force to the ferrule.

In another embodiment, the method comprises: (a) cooling a ferrule below a transition temperature, the ferrule comprising a first material and having no greater than a first diameter below the transition temperature and no less than a second diameter above the transition temperature, and having an endface and holding at least one fiber having a fiber end presented at the endface; (b) inserting the ferrule into a bore hole of the housing while the ferrule is below the transition temperature, the bore hole having a diameter greater than the second diameter and an interface portion having a restricted bore hole having no greater than a third diameter below the transition temperature and no less than a fourth diameter above the transition temperature, the first diameter being less than the third diameter and the second diameter being larger than the fourth diameter; (c) allowing the ferrule to rise above the transition temperature such that the ferrule expands within the interface portion to form an interference fit; and (d) disposing a resilient member in the housing such that the resilient member applies a forward force to the ferrule.

BRIEF DESCRIPTION OF THE DRAWINGS

FIGS. 1(a) and 1(b) show a cross-sectional schematic of one embodiment of the connector of the present invention, in a interference state and in a clearance state, respectively.

FIG. 3 shows a cross-sectional schematic of a prior art connector.

DETAILED DESCRIPTION

Figure 2:
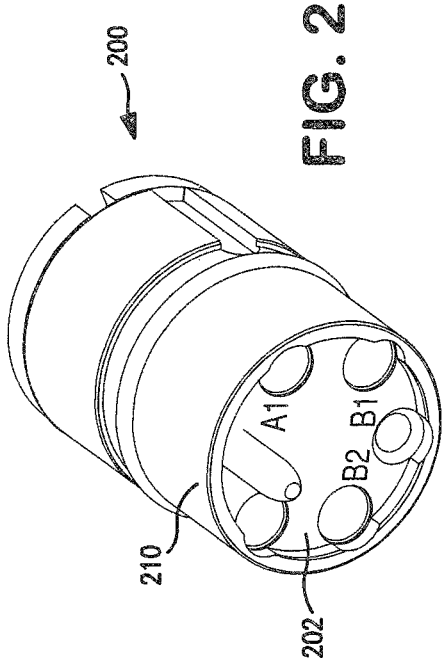
FIG. 2 shows a perspective view of an insert-type housing of an expanded beam connector.

Referring to FIGS. 1(a) and 1(b), a schematic of an optical connector 100 of the present invention is shown in an interference state and in a clearance state, respectively. The connector has a front-and-back orientation and comprises: (a) a ferrule 101 comprising a first material having a first coefficient of expansion (COE), and having no greater than a first diameter $d_1$ below a transition temperature with the temperature range, and no less than a second diameter $d_2$ above the transition temperature, the ferrule also comprising an endface 108, and containing at least one fiber 109 having a fiber end 109a presented at the endface; (b) a spring 103 disposed behind the ferrule 101 and in contact with the ferrule to apply a forward urging force to the ferrule; and (c) a housing 102 comprising a second material having a second COE, the housing defining a bore hole 106 having a diameter $d_b$ greater than the second diameter $d_2$, and an interface portion 104 defining a restricted bore hole 106a having no greater than a third diameter $d_3$ below the transition temperature, and no less than a fourth diameter $d_4$ above the transition temperature. The connector is configured in one of two ways: in a first configuration, the second COE is greater than the first COE, and in the second configuration, the second COE is less than the first COE. In the first configuration, the first diameter $d_1$ is greater than the third diameter $d_3$ and the second diameter $d_2$ is less than the fourth diameter $d_4$. In the second configuration, the first diameter $d_1$ is less than the third diameter $d_3$, and the second diameter $d_2$ is greater than the fourth diameter $d_4$. Accordingly, FIG. 1(a) shows the connector is its interference state, and, thus depicts the first configuration of the connector below the transition temperature, or the second configuration of the connector above the transition temperature. Likewise, FIG. 1(b) shows the connector in its clearance state and thus depicts the first configuration of the connector above the transition temperature, and the second configuration of the connector below the transition temperature.

As stated above, the relationship between the first and third, and second and fourth diameters depends on the transition temperature and the configuration of the connector. For example, considering the first configuration, the COE of the first material is less than that of the second material. This means that, for a given increase in temperatures, the first material will expand less than the second material. When the connector of a first configuration is below the transition temperature, $d_1$ is greater than $d_3$, and thus, the interface portion of the housing holds the ferrule with an interference fit to position it axially. However, when the temperature rises above the transition temperature, and the relationship between the ferrule and the interface portion changes such that $d_2$ is less than $d_4$, the fit at the interface portion transitions from an interference fit to a clearance fit as the ferrule is now able to move within the interface portion. Because the ferrule is free to move in the bore hole 106 of the housing in this state, the biasing force of the spring 103 urges the ferrule 101 forward, thereby serving to position the ferrule axially in the housing.

On the other hand, in the second configuration, the COEs of the first and second materials are reversed, such that the COE of the first material is greater than that of the second material. Consequently, the first material expands/shrinks more than the second material for a given change in temperature. In this embodiment, when the connector is below the transition temperature, $d_1$ is less than $d_3$, thus, the ferrule is free to move within the interface portion of the housing, thereby allowing the spring to bias the ferrule forward. However, when the temperature exceeds the transition temperature, the relationship between the interface portion and the ferrule changes, and the diameter of the ferrule expand to $d_2$ which is greater than $d_4$, thereby creating an interference fit.

Figure 6:
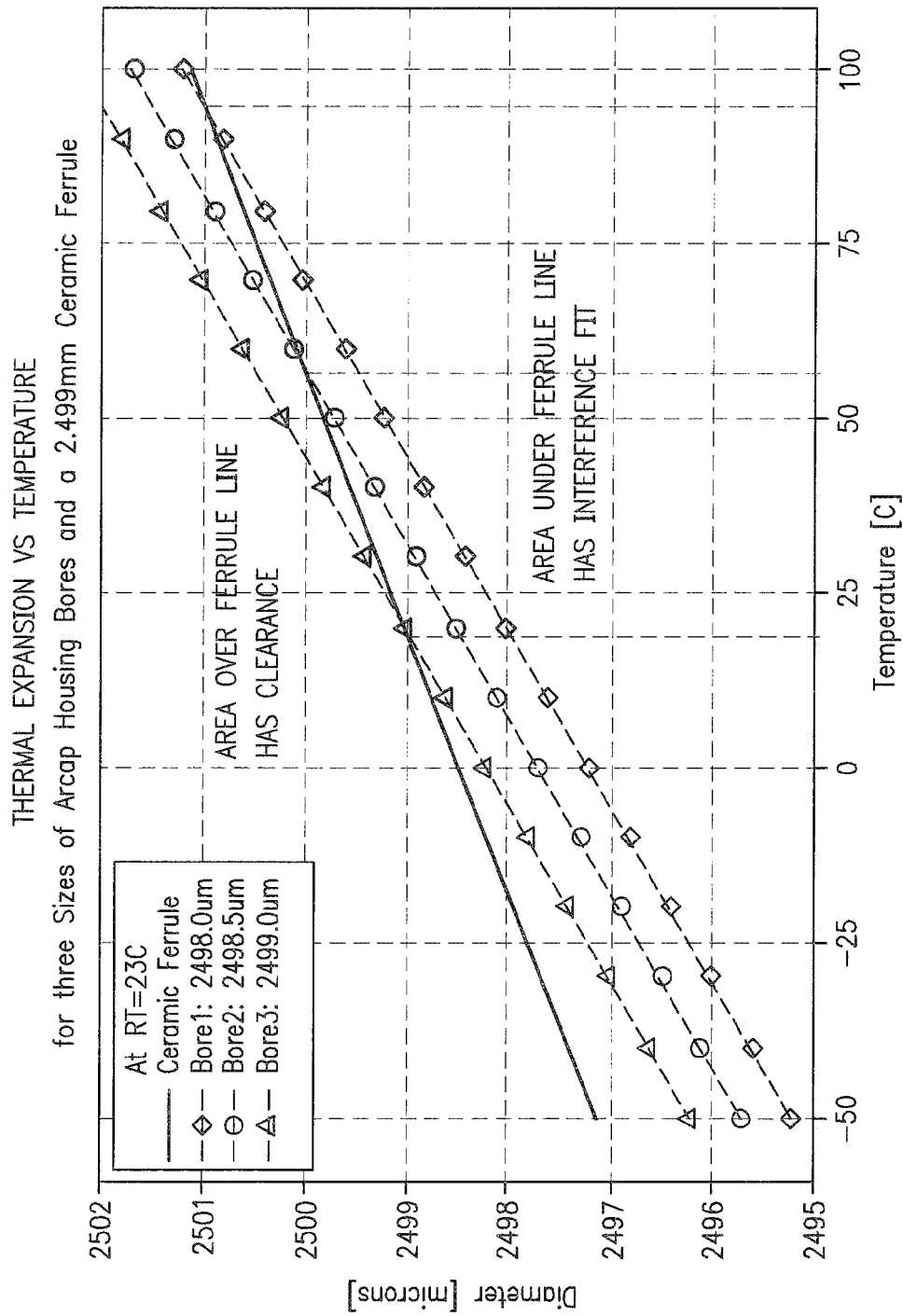
FIG. 6 is a chart showing thermal expansion of the ferrule and restricted bore hole as function of temperature for the first configuration.

As indicated above, the configuration of the connector (first or second) depends upon the selection of COEs of the first and second materials. One of skill in the art can readily determine the COE of the materials used. The transition temperature depends upon the COEs of the materials used and the relative sizes of the ferrule and the restricted bore hole 106a. For example, referring to FIG. 6, a chart showing thermal expansion of the ferrule and restricted bore hole as function of temperature for the first configuration is shown. The dark line corresponds to the ferrule diameter, while the three lighter lines correspond to different diameters of the restricted bore hole 106a. Specifically, at 23° C., bore1 corresponds to a 2498.0 μm bore hole, bore2 corresponds to a 2498.5 μm bore hole, and bore3 corresponds to a 2499 μm bore hole. The ferrule at 23° C. has a diameter of 2499 μm. The slope of these lines depends on the COEs of the respective materials of the ferrule and housing. In this example, the ferrule is made of ceramic and the housing defining the restricted bore hole comprises Arcap. Because the COE of Arcap is greater than that of ceramic, the slope of the restricted bore hole line is larger than that of the ferrule line, necessarily meaning that the lines will cross at some temperature.

Where the ferrule line cross each of the bore hole lines determines the transition temperature for the ferrule and the corresponding restricted bore hole of a given diameter. For example, the transition temperature for the ferrule and bore1 is about 92-97° C., for bore 2 it is about 57-62° C., and for bore3 it is about 18-23° C. Because COEs are defined for most materials used in connectors, one of skill in the art can readily size the ferrule and the restricted bore hole to define a transition temperature within a certain range. When sizing the ferrule and restrictive bore hole it is important that the contraction force of the interface portion around the ferrule does not exceed the elastic deformation of the housing and ferrule material. For example, in the first configuration, after the connector is subjected to colder temperatures, it needs to return to its original dimension at elevated temperatures.

It should be appreciated that the closer the COEs of the first and second materials, the broader the transition temperature range Likewise, if the COEs are significantly different, the transition temperature will be more precise. Generally, although not necessarily, narrower transition ranges are desired such that the connector does not linger in a transition state, in which the fit between the ferule and the interface portion is not completely an interference fit or a clearance fit.

Furthermore, it is generally preferable, although not necessary, that the transition temperature be at the higher or lower end of the expected operating temperature range. In this embodiment, the interference fit is the typical state of the connector, while the clearance fit acts as more of a safety feature at extreme high/low temperatures. Such a configuration is generally preferable to avoid having a clearance fit over an extended temperature range. In other words, the temperature range over which the connector has a clearance fit should be relatively narrow such that thermal expansion does not create excessive tolerances as described above. In one embodiment, the transition temperature is beyond the expected operating temperature range such that the connector has an interference fit for essentially the entire operating temperature range. Accordingly, in one embodiment, the transition temperature is greater than the upper 33% of the operating range, or is less than the lower 33% of the operating range. In another embodiment, the transition temperature is greater than the upper 10% of the operating range, or is less than the lower 10% of the operating range. For example, in this latter embodiment, if the operating temperature range is −40 to 100° C., then the transition temperature for the first configuration would be greater than 86° C., and the transition temperature for the second configuration would be less than −26° C. Alternatively, the connector may be configured to have the transition temperature closer to ambient than to the extremes, for example, in the +25 to +40° C. range for the first configuration, or +20 to 0° C. range for the second configuration.

The connector is described in greater detail below. Throughout this description, reference is made, for illustrative purposes, to an expanded beam connector 200 (FIG. 2) having an insert-type housing 202. It should be understood, however, that the invention is not limited to this embodiment and may be embodied in any optical connector or optical interface having a ferrule contained in a housing, including, for example, a discrete connector (e.g. a single ferrule connector) or an optical interface of a device such as a transceiver.

The ferrule 101 functions to hold the fiber 109 in precise radial position relative to the housing and to present the fiber end 109a at its endface 108 for optical coupling with the lens 104 or mating device. The term ferrule is used synonymously herein with ferrule assembly. (Referring to FIG. 2b, a typical ferrule assembly 215 typically includes a plurality of components, including a ferrule 201, as described above, and a ferrule holder or base 212, which may have a collar 213 or other structure to provide a surface against which the spring 203 urges the ferrule assembly forward.) Suitable ferrules configurations include any cylindrical or rectangular shapes, and single fiber or multifiber types (e.g., MT-type ferrules). (In this respect, it should be understood that the term diameter as used herein to describe the relative diameters of the ferrule and restricted bore holes, are not limited to circular cross sections but apply to any distance as measured through the cross sectional center.) Such ferrules and ferrule assemblies are well known. Indeed, one benefit of the configuration of the present invention is that ordinary and standard ferrules may be used. No special machining or molding is required.

The ferrule comprises a first material, which may be, for example, ceramic, polymer/plastics, metal, glass and composites. In one embodiment, the ferrule comprises ceramic which has a COE comparable to that of fiber. Again, such ferrule materials are well known.

The housing 202 functions to hold the ferrule assembly and, optionally, a lens 105, in precise axial and radial alignment. The housing 202 comprises a second material having a second COE. Examples of suitable materials include, for example, ceramics, polymer/plastics, metals including alloys, such as stainless steel and Arcap, and composite materials. In one embodiment, the material is Arcap.

The housing 202 defines at least one bore hole 206 and a restricted bore hole 206a. The bore hole has a diameter no less than the second diameter of the ferrule 201. Accordingly, there is a clearance fit between the ferrule 201 and the bore hole 206 housing, regardless of the temperature, allowing the ferrule 201 to move within the bore hole 206 of the housing. The interface portion 204 of the housing 202 has restricted bore hole 206a having a diameter that no greater than a third diameter at temperatures below the transition temperature, and that is no less than a fourth diameter above the transition temperature. This facilitates an interference fit below the transition temperature and a clearance fit above the transition temperature.

Although the interface portion can be located anywhere along the bore hole to grip the ferrule, in one embodiment, it is located at the front of the housing 202, forward of the bore hole 206. Although not required to practice the invention, such an embodiment has certain advantages. For example, if the interface portion is located at the forward end of the bore hole, near the ferrule endface, which optically couples with the lens or mating structure, there is relatively little housing material undergoing expansion between the interface portion and the endface of the ferrule, and thus, the ferrule will move relatively little prior to the interface portion transitioning to a clearance fit. Conversely, if the interface portion were located further away from the ferrule endface—i.e., rearward of the optical coupling, the additional material of the housing between the interference portion and the ferrule endface would cause more rearward movement of the ferrule during thermal expansion of the ferrule before the interface portion transitioned from an interference fit to a clearance fit.

Additionally, in this embodiment, the interface portion has a relatively short length, $l_1$, which may be just a fraction of the length of the ferrule. Again, although not required to practice the invention, such an embodiment has certain advantages. First, because the interference fit is limited to a relatively small length of the ferrule (as opposed to the entire length of the bore hole 206), it is relatively easy to control. In other words, when the temperature increases to the transition temperature and the interface portion transforms to a clearance fit, it will do so more predictably because there is less surface area and thus lower probability of surface anomalies impeding this transition. Although the length $l_i$ of the interface portion may vary, suitable results have been achieved with a length $l_i$ no greater than, for example, ½ the ferrule length $l_f$, and even shorter, for example, less than ⅓ the ferrule length $l_f$.

Figure 5A:
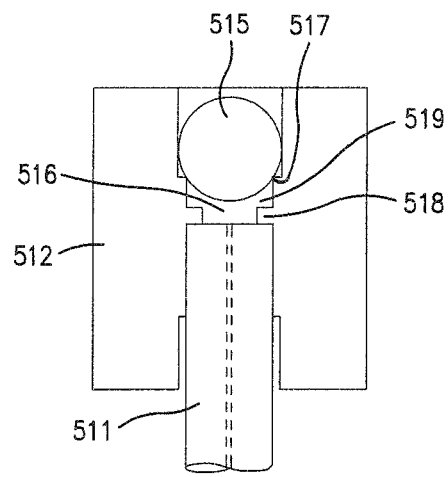
FIGS. 5(a)-5(d) show alternative connector configurations of the present invention.
Figure 5B:
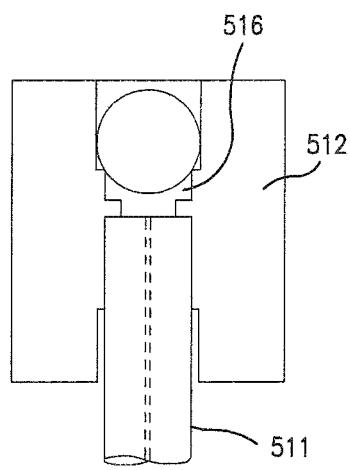

The connector of the present invention may be configured in different way to provide forward register the ferrule. For example, as shown in FIGS. 1 and 2, the ferrule may be registered in the housing by virtue of physical contact between the lens 205 and the endface 108 of the ferrule. Alternatively, the ferrule may be registered in the housing by virtue of stops or spacers as shown in FIGS. 5a-5d. Referring to FIG. 5a, stop 518 positions the ferrule 511 axially in the housing 512. So rather than the spring (not shown) urging the ferrule forward into the lens 515 to position it axially when the connector is in its clearance fit state, the spring urges the ferrule into the stop 518. In this particularly embodiment, the lens 515 is positioned in the housing by virtue of a second stop 517, thereby creating a space 516 between the lens and the endface of the ferrule. In this embodiment, the space is filled with an index matching gel 519 or another optically-transparent material. Referring to FIG. 5b, a connector configuration similar to that of FIG. 5a is shown except the space 516 is not filled with a gel but is an air gap.

Figure 5C:
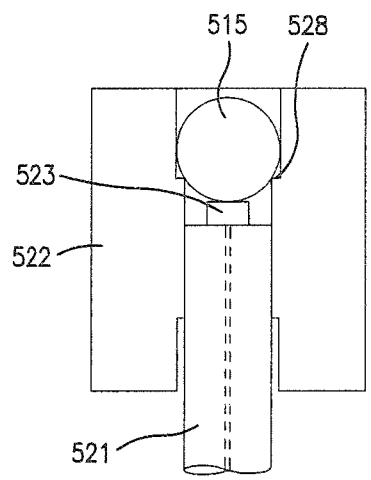

Referring to FIG. 5c, the connector employs a glass element 523 affixed to, or otherwise disposed between, the endface of the ferrule 521 and the lens as disclosed in U.S. Patent Publication No. 20080050073 (hereby incorporated by reference). The axial position of the ferrule 521 in the housing 522 is achieved by physically contacting the glass element 523 with the lens 515. As with the embodiments shown in FIGS. 5a and 5b, the lens 525 is positioned by virtue of a stop 528.

Figure 5D:
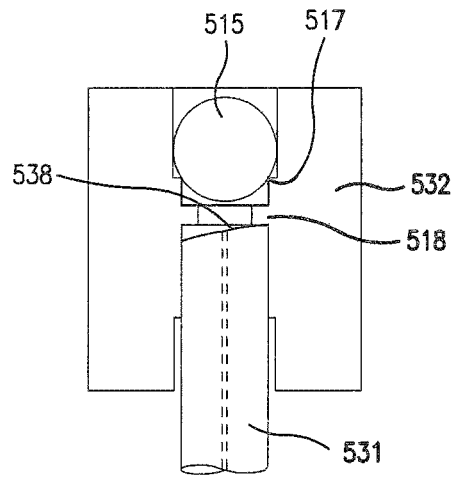

Referring to FIG. 5d, the housing 532 is similar in configuration to that shown in FIGS. 5a and 5b. Specifically, the stop 518 is used to position the ferrule 531 and stop 517 is used to position the lens 515. However, the endface 538 of the ferrule 531 in FIG. 5d is not polished perpendicularly to the optical axis, but rather is an angle (APC) polished ferrule.

The resilient member or spring 203 functions to provide a forward urging force to the ferrule. The spring may be any resilient member capable of providing axial force when compressed. Although this urging force has no effect on the ferrule when the connector is operating in conditions under the transition temperature (because the ferrule is held in axial position in the housing by the interference fit), if the operating temperature exceeds the transition temperature, and the interface transitions to a clearance fit, the spring will urge the ferrule forward and maintain its proper register or axial position in the housing. For example, if the connector has a lens and the ferrule makes physical contact with the lens, then the spring will urge the ferrule against the lens above the transition temperature. On the other hand, if the connector has an air gap between the ferrule and the lens, or if no lens is used, then the ferrule may be pushed against a stop or other structure in the housing to maintain its proper axial position above the transition temperature.

The lens 105 functions, in one respect, to expand and collimate a relatively narrow optical beam emitted from a fiber into a relatively large beam for transmission through an air gap and into the light path of a mating structure, and, in another respect, to focus a relatively large collimated beam from the mating structuring into the fiber. Suitable lenses include any optical component that is capable of expanding/focusing a light beam, and include, for example, a ball lens, a GRIN lens, or a lens or lens assembly containing spherical or aspherical surfaces with uniform or graded index lenses.

Figure 2B:
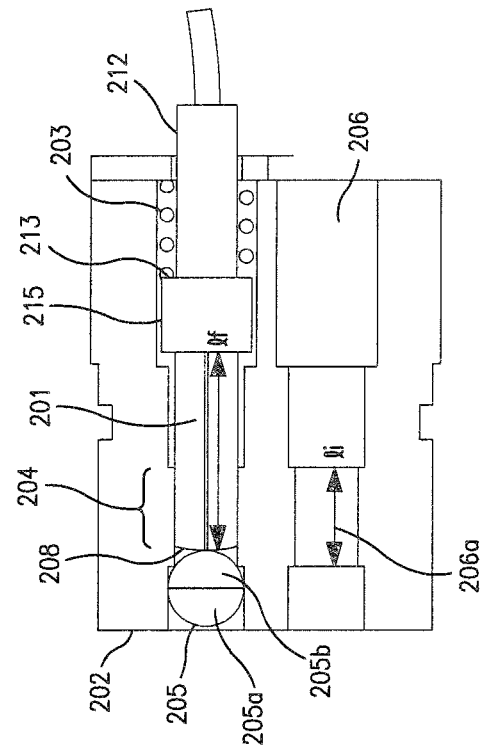
FIGS. 2(a) and 2(b) show a front view and a cross-sectional view of the housing of FIG. 2.
Figure 2A:
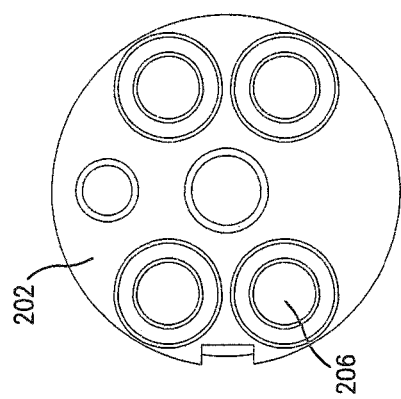
Figure 4B:
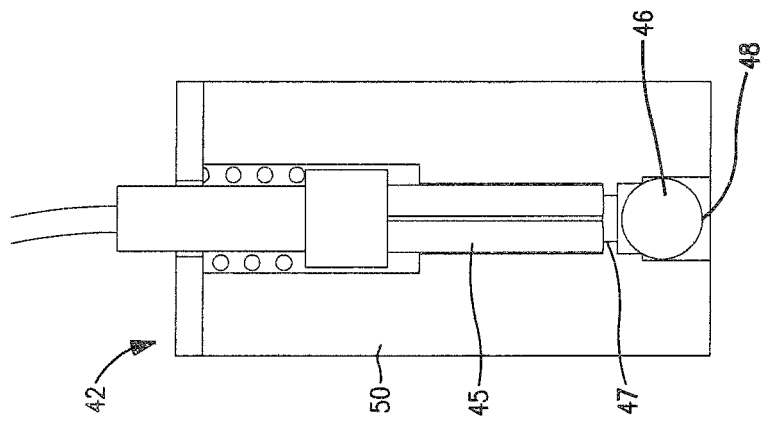
FIGS. 4(a) and 4(b) show schematics of prior art single mode and multimode expanded beam connector inserts.
Figure 4A:
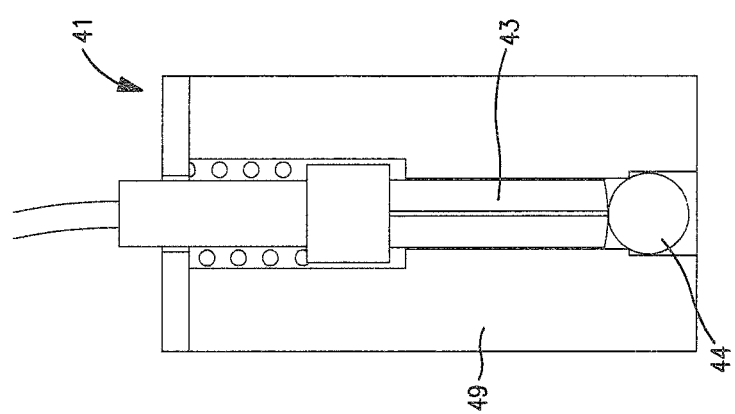

In one embodiment, the lens 205 is a ball lens coated with an antireflective (AR) material 205a for an air/glass interface. For an air-to-glass interface, an ideal coating will have an index of sqrt(n) where n is the index of refraction of the lens material relative to air. The coating thickness is $\lambda/(4n)$ where $\lambda$ is the wavelength in air. The coating may be applied only at the region that the light path passes through the lens, or it may be applied uniformly around the ball lens for simplicity and ease of manufacture (i.e., no need to align the lens in the housing). If physical contact is used between the lens and the ferrule, then one hemisphere is AR coated for an air/glass interface and the other hemisphere is AR coated with a material 205b for a glass/glass interface as shown in FIG. 2b.

Another aspect of the invention is a method for manufacturing the connector. Referring to FIGS. 1(a) and 1(b), in one embodiment, to manufacture the connector of the first configuration, the method comprises heating the housing 102 to at least the transition temperature such that the diameter of the interface portion expands to at least the fourth diameter $d_4$. Because $d_4$ is larger than $d_1$, the restrictive portion can then receive the ferrule. Alternatively, the ferrule may be cooled such that its diameter is less than $d_3$. However, because the ferrule is typically made from a material, such as ceramic, that has a relatively small coefficient of thermal expansion, the temperature may have to be dropped significantly to shrink the ferrules below $d_3$. As the temperature difference between the ferrule and housing decreases (i.e. through the housing cooling or the ferrule warming), the ferrule will be secured in the housing by an interference fit. This technique allows the assembly to be reheated and the ferrule removed and replaced if necessary.

The spring and the lens (if used) may be disposed in the housing while the housing is heated or after it cools. If a lens is used and physical contact between it and the ferrule is desired, it may be beneficial to adhere the lens to the housing before it is heated, and then insert the spring prior to the housing cooling. This way, the spring will urge the ferrule into the lens as the fit between the interface portion and the ferrule transforms from a clearance fit to an interference fit during the cooling of the housing. Likewise, if the ferrule is designed to seat against a stop in the housing, it may be beneficial to install the spring in the housing before the housing cools such that the spring urges the ferrule against the stop during the cooling phase.

This interference fit used in the connector of the invention facilitates the easy removal and replacement of defective fibers/ferrules. Specifically, if a defective fiber or ferrule is detected, the housing may be heated or cooled beyond the transition temperature such that the interface between the ferrule and the housing becomes a clearance fit, thereby allowing the ferrule to be removed from the housing with no damage to the housing.

It may beneficial to polish the endface of the ferrule to provide a specific geometry. Furthermore, it may be desirable to affix a glass element to the ferrule or use a glass element as a spacer combined with gel. It may be desirable to apply an AR-coated glass element as disclosed in US Publication no. 20080050073, hereby incorporated by reference.

What is claimed is:

1. An optical connector having a front and back orientation, said connector comprising:
    a ferrule comprising a first material having a first coefficient of thermal expansion (COE), and having a first diameter at a first temperature, and a second diameter at a second temperature, said ferrule also comprising an endface;
    a housing comprising a second material having a second COE, said housing having a restricted borehole having a third diameter at said first temperature, and a fourth diameter at said second temperature;
    a resilient member disposed in said housing and in contact with said ferrule to apply a forward urging force to said ferrule;
    wherein said connector has a first and second configuration, in said first configuration, said second COE is greater than said first COE, said first diameter is greater than said third diameter such that said connector is in an interference state at said first temperature, and said second diameter is less than said fourth diameter such that said connector is in a clearance state at said second temperature, in said second configuration, said second COE is less than said first COE, said first diameter is less than said third diameter such that said connector is in said clearance state at said first temperature, and said second diameter is greater than said fourth diameter such that said connector is in said interference state at said second temperature; and
    wherein said connector is in said interference state at room temperature.

2. The connector of claim 1, wherein said connector is in said interference state for a majority of its operating temperature range.

3. The connector of claim 1, wherein said connector is in said interference state from at least room temperature down to its lowest operating temperature.

4. The connector of claim 3, wherein said connector has an operating temperature range of about −46 to 71° C.

5. The connector of claim 1, wherein said connector transitions from its interference state to its clearance state either in or above the top third of its operating temperature range in said first configuration, or in or below the bottom third of said operating temperature range in said second configuration.

6. The connector of claim 1, further comprising:
    a lens disposed within said housing.

7. The connector of claim 6, wherein said endface is in physical contact with said lens.

8. The connector of claim 7, wherein said housing defines a stop, said ferrule endface contacting said stop to register the endface in said housing.

9. The optical connector of claim 8, wherein said endface and said lens are spaced apart to form an air gap.

10. The optical connector of claim 8, wherein said endface and said lens are spaced apart to form a gap filled with an optical gel or an optically-transparent material.

11. The connector of claim 1, wherein said restricted borehole has a length less than ½ the length of said ferrule.

12. An optical connector having a front and back orientation, said connector comprising:
- a ferrule comprising a first material having a first coefficient of thermal expansion (COE), and having a first diameter at a first temperature, and a second diameter at a second temperature, said ferrule also comprising an endface;
- a housing comprising a second material having a second COE, said housing having a borehole having a third diameter at said first temperature, and a fourth diameter at said second temperature;
- a resilient member disposed in said housing and in contact with said ferrule to apply a forward urging force to said ferrule;
- wherein said connector has a first and second configuration, in said first configuration, said second COE is greater than said first COE, said first diameter is greater than said third diameter such that said connector is in an interference state at said first temperature, and said second diameter is less than said fourth diameter such that said connector is in a clearance state at said second temperature, in said second configuration, said second COE is less than said first COE, said first diameter is less than said third diameter such that said connector is in said clearance state at said first temperature, and said second diameter is greater than said fourth diameter such that said connector is in said interference state at said second temperature; and
- wherein said connector is in said interference state at room temperature.

13. The connector of claim 12, wherein said connector is in said interference state for a majority of its operating temperature range.

14. The connector of claim 12, wherein said connector is in said interference state from at least room temperature down to its lowest operating temperature.

15. The connector of claim 14, wherein said connector has an operating temperature range of about −46 to 71° C.

16. The connector of claim 12, wherein said connector transitions from its interference state to its clearance state either in or above the top third of its operating temperature range in said first configuration, or in or below the bottom third of said operating temperature range in said second configuration.

17. The connector of claim 12, further comprising:
a lens disposed within said housing.

18. The connector of claim 17, wherein said endface is in physical contact with said lens.

19. The connector of claim 18, wherein said housing defines a stop, said ferrule endface contacting said stop to register the endface in said housing.

20. The optical connector of claim 19, wherein said endface and said lens are spaced apart to form an air gap.

21. The optical connector of claim 19, wherein said endface and said lens are spaced apart to form a gap filled with an optical gel or an optically-transparent material.

* * * * *